United States Patent [19]

Reed et al.

[11] Patent Number: 5,681,668
[45] Date of Patent: *Oct. 28, 1997

[54] DUAL WALL STORAGE BATTERY SYSTEM HAVING AIR PASSAGEWAYS IN THE BOTTOM OF THE BATTERY

[75] Inventors: Michael E. Reed, Cedarburg; Thomas J. Dougherty, Waukesha; Mark S. Inkmann, Wauwatosa; Debra L. Smith, West Allis; Michael T. Reher, Grafton, all of Wis.

[73] Assignee: Globe-Union, Inc., Milwaukee, Wis.

[*] Notice: The term of this patent shall not extend beyond the expiration date of Pat. No. 5,543,248.

[21] Appl. No.: 466,550

[22] Filed: Jun. 6, 1995

Related U.S. Application Data

[63] Continuation-in-part of Ser. No. 390,682, Feb. 17, 1995, Pat. No. 5,543,248.
[51] Int. Cl.⁶ .................................................. H01M 2/10
[52] U.S. Cl. ........................ 429/100; 429/120; 429/163; 180/68.5
[58] Field of Search ........................... 429/100, 97, 120, 429/163, 175, 176, 187; 180/68.5

[56] References Cited

U.S. PATENT DOCUMENTS

| 3,146,132 | 8/1964 | Nathan | 429/100 |
| 4,468,440 | 8/1984 | Evjen | 429/8 |
| 5,031,712 | 7/1991 | Karolek et al. | 180/68.2 |
| 5,212,025 | 5/1993 | Shibata et al. | 429/120 |

*Primary Examiner*—John Niebling
*Assistant Examiner*—Brendan Mee
*Attorney, Agent, or Firm*—Harness, Dickey & Pierce, P.L.C.

[57] ABSTRACT

A battery shield for a storage battery includes first and second members which are dimensioned to fit around the battery, forming a shield structure, that is open at its top and encloses the battery on all four sides and on the bottom, forming a heat shield for protecting the battery from hot temperatures, the first and second members being hinged to a common base and are adapted to be pivoted about respective hinges outwardly away from another to an open position to facilitate installation of a battery in the shield and to then be moved upwardly and toward one another, in the manner of a "clamshell", to a closed position for enclosing the battery within the battery shield, the bottom of the storage battery having a plurality of transverse channels therein extending between opposing sides for permitting air flow around the bottom of the storage battery when the battery is enclosed within the battery shield.

13 Claims, 8 Drawing Sheets

DUAL WALL STORAGE BATTERY SYSTEM HAVING AIR PASSAGEWAYS IN THE BOTTOM OF THE BATTERY

RELATED APPLICATION

This application is a continuation-in-part of application Ser. No. 08/390,682, of Thomas J. Dougherty et al., which was filed on Feb. 17, 1995, and which is entitled "THERMAL STABILIZATION SHIELD FOR STORAGE BATTERIES", now U.S. Pat. No. 5,543,248.

BACKGROUND OF THE INVENTION

1. Field of the Invention

This invention relates to storage batteries, and more particularly, to a thermal stabilization arrangement for storage batteries wherein the battery is enclosed within a shield for providing thermal stabilization for the storage battery.

2. Description of the Prior Art

The automotive industry has long recognized the need to protect motor vehicle batteries from hot underhood temperatures. It is well established that subjecting the storage batteries to the hot temperatures that are present in the vehicle engine compartment during operation of the vehicle accelerates corrosion of the battery grids. Such corrosion is a major factor in shortening the lifetime of the battery. Conventionally, vehicle storage batteries are protected from underhood heat by placing an insulating shell or shield around the battery. Generally, the shell encloses the battery and acts as an insulator, but the shell may be designed to provide an air gap between the sidewalls of the battery and the shell through which cooler outside air is circulated either by a fan or as the result of vehicle motion.

Most known battery shield systems do not provide insulation at the bottom of the battery. Testing has shown that heat transfer especially through the metal trays that support the battery in the vehicle can be significant.

A further consideration is that typically, the insulating shell is mounted on the battery after the battery has been installed in the vehicle. However, it is generally recognized in the automotive industry that subassembly of the insulating shell with the battery prior to the final assembly line will reduce overall costs.

In U.S. Pat. No. 5,212,025 which was issued to Osamu Shibata et al. on May 18, 1993, there is disclosed a storage battery for automobiles which includes a heat shield that is designed to be a part of the battery assembly, making it easier to mount the battery in an automobile. The heat shield is a box-like structure having a closed bottom and which is open to the top to permit the battery to be positioned within the heat shield. The cover of the battery includes an overhang which extends downwardly from the peripheral edge of the cover, spaced outwardly from the sidewall of the battery container, defining a gap which receives the upper edge of the heat shield. This arrangement defines a space between the battery container and the heat shield that is closed to air outside of the heat shield. The heat shield is designed to be attached securely to the battery container. To this end, the battery container has recesses formed in its sidewalls for receiving projections on the heat shield to detachably secure the heat shield to the battery. Thus, this arrangement requires a non-standard cover for the battery to define the air gap and a non-standard container to provide the latching recesses for securing the heat shield to the battery. Moreover, this arrangement requires modification of the battery hold down tray and hold down hardware. In addition, no provision is made for the circulation of air between the bottom of the battery and the heat shield.

SUMMARY OF THE INVENTION

The present invention provides a thermal stabilization arrangement for storage batteries, and in particular for motor vehicle storage batteries. The arrangement includes a battery shield that is dimensioned to fit around the container portion of such batteries, enclosing the storage battery on all four sides and at the bottom, providing a thermal barrier between the shield structure and the sides of the storage battery. The upper portion of the battery shield is spaced apart from the upper portion of the sides of the storage battery over a substantial portion thereof, defining an air cavity between the upper portion of the sides of the battery and the inner surfaces of the battery shield. The air within the cavity defined by the battery shield provides an insulating layer between the battery shield and the battery. The lower portion of the battery shield conforms to the shape of the battery and engages the lower portion of the sides of the storage battery, allowing the battery shield to serve as part of the hold down mechanism for the storage battery. In this regard, the battery shield is adapted to accommodate hold down shoulders of the battery on which it is installed and conventional hold down hardware. Consequently, the battery shield can be mounted on conventional storage batteries and without modification of the battery hold down tray or hold down hardware.

Further in accordance with the invention, the bottom of the storage battery includes air flow path defining means which defines at least one air flow path between the bottom of the storage battery and the battery shield for permitting air flow around the bottom of the storage battery when the storage battery is enclosed within the battery shield. The air flow path defining means includes one or more channels in the bottom of the storage battery, the channels extending between first and second opposing sides of the storage battery.

In accordance with a feature of the invention, the battery shield includes first and second sections which are hinged to a base portion of the battery shield. The first and second sections are adapted to be pivoted about their respective hinges outwardly away from another to an open position to facilitate installation of a storage battery in the shield and to then be moved upwardly and towards one another, in the manner of a "clamshell", to a closed position for enclosing the storage battery within the battery shield. Because the front and rear sections are separated from one another when the shield is in its open condition, it is easier to position a storage battery within the open shield. Moreover, during installation, as the storage battery is lowered into the shield and placed on the base portion, the weight of the battery on the base causes the first and second sections to pivot about respective hinges toward one another to the closed position. Thus, the battery shield provided by the present invention is more space efficient, cost effective and thermally effective than comparable existing battery enclosures and is characterized by ease of assembly on the storage battery with which it is used.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF PREFERRED EMBODIMENTS

Figure 1:
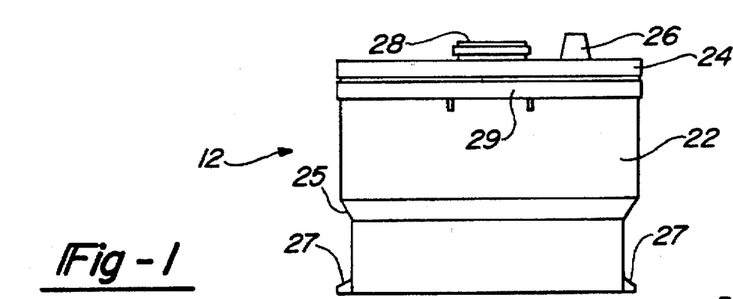
FIG. 1 is a perspective end view of the battery shield provided by the present invention, the battery shield being shown in the open condition during the installation of a storage battery which is shown in phantom.
Figure 2:
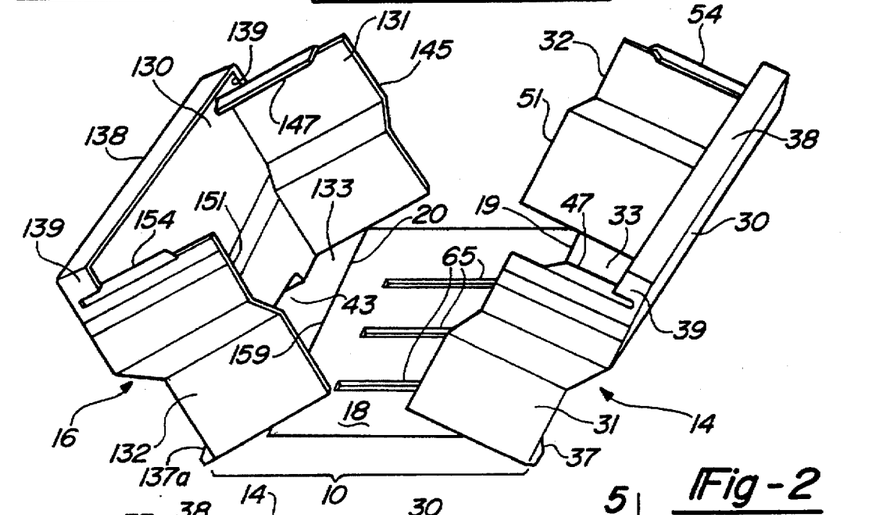
FIG. 2 is a top plan view of the battery shield shown in FIG. 1.

Referring to the drawings, FIG. 1 is a perspective end view of the battery shield 10 provided by the present invention, shown in the open condition during the installation of a storage battery 12, which is shown in phantom in FIG. 1. The battery shield 10 includes a front section 14 and a rear section 16 which are hinged to a bottom or base 18 by respective living hinges 19 and 20 which extend transversely of the base. The battery shield 10 is adapted to be closed around the battery 12, with its front and rear sections enclosing the battery on all four sides and on the bottom, forming a shield structure that provides thermal stabilization for the battery when such stabilization is needed. In accordance with a feature of the invention, the battery shield forms a portion of the battery hold down mechanism. To this end, the battery shield is configured to fit in existing battery hold down trays and to accommodate conventional hold down clamps and associated hardware, thereby obviating the need to modify existing hold down trays.

The primary function of the battery shield is to protect a storage battery, such as battery 12, from heat. For example, when the battery shield is installed on a motor vehicle battery, the battery shield protects the battery from hot underhood temperatures produced in the engine compartment of the motor vehicle in which the battery is located. However, insulating properties of the battery shield 10 enable the battery shield to retain heat longer than does the engine compartment. Consequently, under cold weather driving conditions, the temperature at the battery housing can be higher than the temperature in the engine compartment, resulting in improved charge rates and higher state of charge, depending upon the amount of time that has elapsed since the vehicle engine was last running and on whether or not the vehicle has been parked in a garage.

In the exemplary embodiment, the storage battery 12 is a conventional lead acid storage battery and includes a container 22, which contains the battery cells and the electrolyte, and a cover 24. However, the battery shield can be used with other types of batteries. The battery cover 24 closes the open upper end of the container and mounts the positive and negative battery terminals 26. In addition, the battery cover 24 includes vents 28 as is known. The battery includes hold down shoulders 27 which extend along the lower edges of the front and rear sides of the container. The hold down shoulders include first and second portions with a gap therebetween to accommodate the hold down hardware, as is known. The battery 12 has handle attachments or handle brackets 29 formed integrally with the container at opposite ends thereof to permit a handle (not shown) to be removably secured to the battery to facilitate lifting of the battery during manufacture of the battery and/or during installation of the battery in a vehicle. In after-market batteries, such handle brackets are used to mount handles for the convenience of a purchaser of the battery in carrying the battery and in the installation of the battery in a vehicle.

Figure 3:
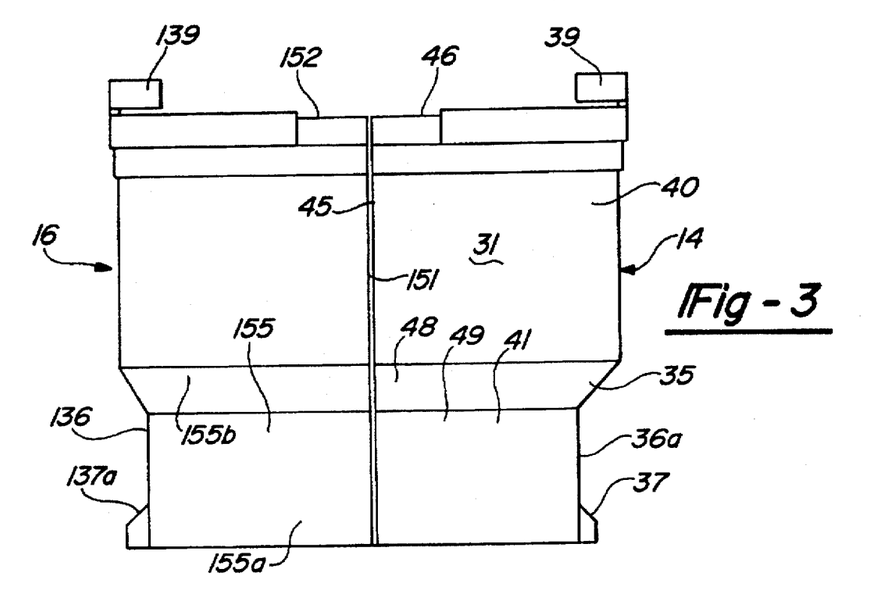
FIG. 3 is a side view of the battery shield shown in FIG. 1.
Figure 4:
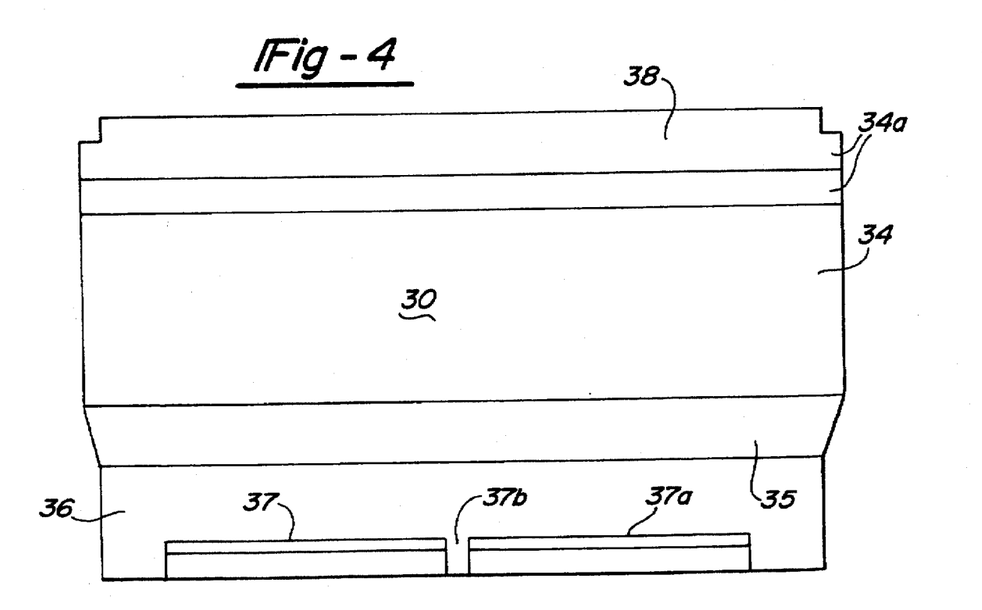
FIG. 4 is a front view of the battery shield shown in FIG. 1.

Referring additionally to FIGS. 2–5, the front section 14 is a one-piece member which includes a front panel 30, end panels 31 and 32 and a bottom panel 33. The front panel 30 has an upper portion 34 that is generally rectangular in shape and a lower portion 35. The upper portion 34 of the front panel 30 includes a horizontal flange 38 inwardly directed and extending along its upper peripheral edge. The flange has its ends 39 bent downwardly at a right angle. The front panel has a region of increased thickness 34a near its upper edge to provide strengthening for the flange 38. The top part of lower portion 35 slants downwardly and inwardly relative to the forward surface of the upper portion as indicated at 36, and the bottom part of lower portion 35 continues vertically downward, as indicated at 36a, and then projects outwardly, defining a single shoulder, or a pair of shoulders 37 and 37a which are spaced apart from one another at the center of the panel defining a gap 37b as illustrated in FIG. 4. The shoulders 37 and 37a define compartments 43, which are sized to receive the hold down shoulders of the battery. Only one such compartment is provided when the panel is formed with a single shoulder which extends the length of shoulders 37 and 37a. The gap 37b accommodates the battery hold down bolt (not shown). As shown in FIG. 4, the shoulders 37 and 37a extend along the bottom edge of the front panel 10 and are located inwardly relative to the forward surface of the upper portion 34, as shown in FIG. 3. Alternatively, the lower portion 35 can taper down and inward from the upper portion 34 to the shoulders 37 and 37a or to the bottom edge of panel 30, eliminating the vertically extending portion 36a.

Referring to FIG. 3, the end panel 31 of the battery shield 10 is shaped somewhat similar to the front panel 30 and includes a generally rectangular upper portion 40 and a lower portion 41. The end panel 31 has a vertically extending inward edge 45 and an upper edge 46 which includes an inwardly directed flange 47 that extends about one half the length of the end panel from its front edge toward its edge 45. The top part of the lower portion 41 slants inwardly, as indicated at 48, and then extends downward in a generally vertically fashion to the lower edge thereof, as indicated at 49.

Figure 5:
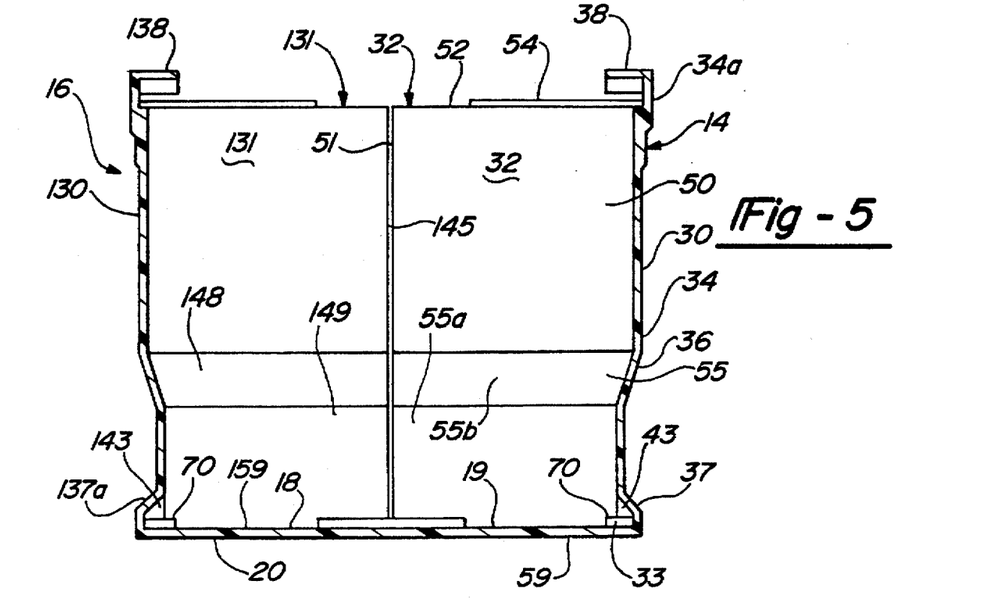
FIG. 5 is a section view taken along the line 5—5 in FIG. 2.

The other end panel 32 is identical to but complementary in shape to end panel 31. As shown in FIG. 5, end panel 32 includes a generally rectangular upper portion 50 and a lower portion 55. End panel 32 has a vertically extending inward edge 51 and an upper edge 52 which includes an inwardly directed flange 54 that extends about one-half the length of the end panel from its front edge toward its edge 51. The lower portion 55 of the end panel 32 includes a vertically extending portion 55a which is spaced inward relative to the upper portion 50 and is connected to the upper portion 50 by an inwardly slanting portion 55b.

The bottom panel 33 of front section 14 is generally rectangular and is formed integrally with the lower edges of front panel 30 and end panels 31 and 32. The two end panels 31 and 32 of the front section 14 are formed integrally with and extend at a right angle to the front panel 30, defining an upright structure which is open at the top and partially closed at the bottom by the bottom panel 33 as shown in FIG. 1.

Figure 6:
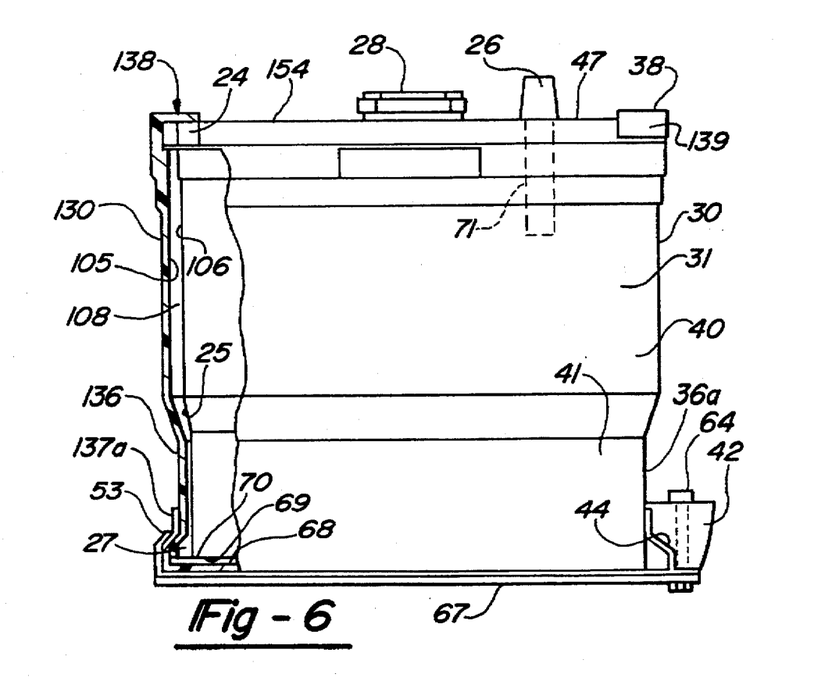
FIG. 6 is a side view illustrating the battery shield provided by the invention with a battery installed therein, and with a portion of the battery shield along one corner being broken away to show the relationship between the inner surface of the battery shield and the outer surface of the battery container.

The rear section 16 of the battery shield 10 is identical to the front section 14 and accordingly will not be described in detail. Elements of the rear section 16, which are shown in the drawings, have been given the same reference numerals as corresponding elements of the front section 14, but preceded by a "1" so that the numerals are incremented by a factor of "100". The edges 45 and 51 of front section 14 mate with respective edges 151 and 145 of rear section 16 in abutting relationship when the battery shield is closed as shown in FIGS. 3 and 5, or installed on and closed around the battery as shown in FIG. 6, for example.

The base 18 of the battery shield 10 is a flat generally rectangular member which extends between bottom panel 33 of the front section 14 and bottom panel 133 of the rear section 16. The living hinge 19 connects an inward edge 59 of the bottom panel of front section 14 to the base 18. The living hinge 20 connects inward edge 159 of the bottom panel 133 to the base 18. The hinges 19 and 20 are molded integrally with the front and rear sections and the base.

Figure 8:
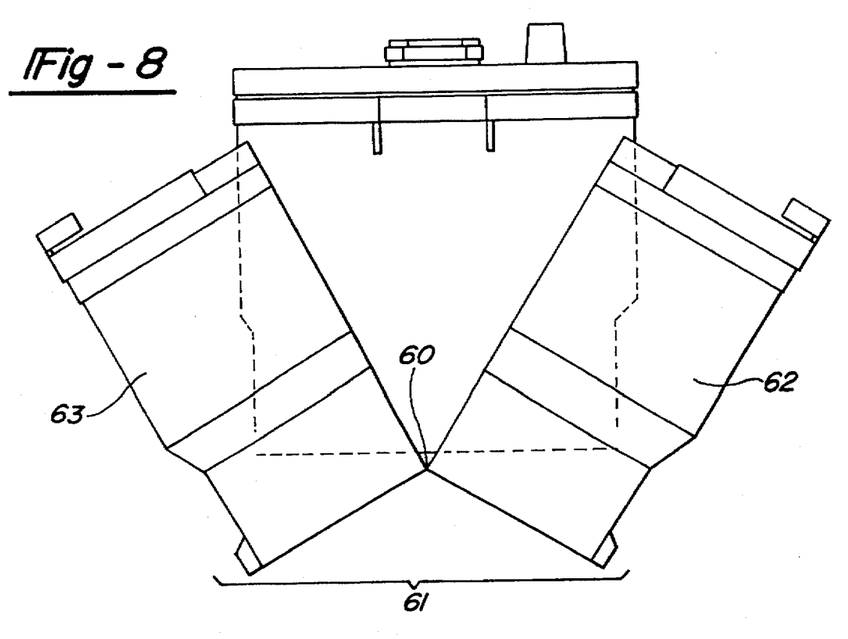
FIG. 8 is a side view of a battery shield in accordance with a further embodiment of the invention in which the front and rear sections of the battery shield are hingedly connected to one another by a single living hinge, the battery shield being shown in the open position with a storage battery mounted therein.

In the embodiment of the battery shield 10 shown in FIGS. 1–5, a double living hinge arrangement is used to connect the front section 14 and the rear section 16 to the base 18. It is pointed out that a single living hinge can be used, such as hinge 60 for the embodiment of the battery shield 61 illustrated in FIG. 8. In this embodiment, the base is molded as a part of the front section 62 and the rear section 63, i.e., an extension of the bottom panels thereof. Moreover, a single or double living hinge of such battery shield can be located at the lower edge of the front panel 30 and rear panel 130, or even part way up from the lower edge of the front and rear panels. For example, one or both living hinges can be located in the vertically extending areas 36a and 55a of the front and rear panels 30 and 130, respectively, but below the slanting surfaces 36 and 55b.

The base 18 includes a plurality of parallel, ribs 65 which extend upwardly from the upper surface 66 thereof between the front and rear sections 14 and 16. The ribs 65 are equally spaced along the base 18 between the sides thereof. The ribs 65 support the battery in a position that is raised above the upper surface 66 of the base 18, the lower surface of which rests on the hold down tray 67 (FIG. 6) which is mounted in the vehicle in which the storage battery is used. This provides an air gap 68 between the bottom surface 69 of the battery 12 and the upper surface of the battery shield base 18 for minimizing heat transfer between the bottom surface 69 of the battery and the hold down tray 67. In addition, the base 18 includes a plurality of support ribs 70, shown in FIG. 5, which extend normal to the side panel and into the compartments 43 defined by the shoulders 37 and 37a and the shoulders, such as shoulder 137a, in the rear section. The support ribs 70 underlie the battery in the proximity of the hold down shoulder for urging the battery hold down shoulder upwards into engagement with the inner surfaces of the compartments 43 and 143 of the battery shield.

When the battery 12 is mounted on the hold down tray 67 of the vehicle in which the battery is used, the battery shield 10 cooperates with the hold down mechanism in securing the battery to the hold down tray 67. The hold down mechanism which includes an inwardly directed flange 53 formed on the forward edge of the hold down tray 67 and hold down clamp 42 which has a sloping clamping surface 44 that conforms to the shape of the shoulders 37 and 37a, and thus to the shape of the hold down shoulders 27 of the battery. The battery shield 10 with the battery 12 installed therein is mounted on the hold down tray with the rear hold down shoulder or shoulders of the battery positioned in the space defined by the inwardly directed flange 53. Then, the hold down clamp 42 is positioned on the hold down tray with its clamping surface 44 in engagement with the shoulders 37 and 37a on the front of the battery shield. The flange 53 captures hold down shoulders 137a and 137 on the back of the battery shield and the sloping surface 44, by its engagement with the shoulders 37 and 37a, secures the batter;y shield 10 to the hold down tray 67 so that the force of the hold down clamping mechanism is transferred through the battery shield 10 to the battery 12. The hold down clamp is secured to the hold down tray by suitable fasteners, such as bolt 64, the which extends through a hole in the hold down clamp with its end received in a tapped hole in the hold down tray.

The upper portion of the battery shield is contoured so as to avoid contact with critical areas of the battery, such as the terminal area at the top of the battery, while the lower portion of the shield engages sidewall portions of the battery container and the hold down shoulders, so that the battery shield functions as part of the hold down mechanism for the battery. The upper edges of the panels extend just below the height of the battery cover, maximizing accessibility to the battery terminal area. The front panel of the battery shield can include notches, such as the notch 71 shown by dashed lines in FIG. 6, along its upper peripheral edge, allowing the battery shield 10 to be used with side terminal batteries.

Figure 9:
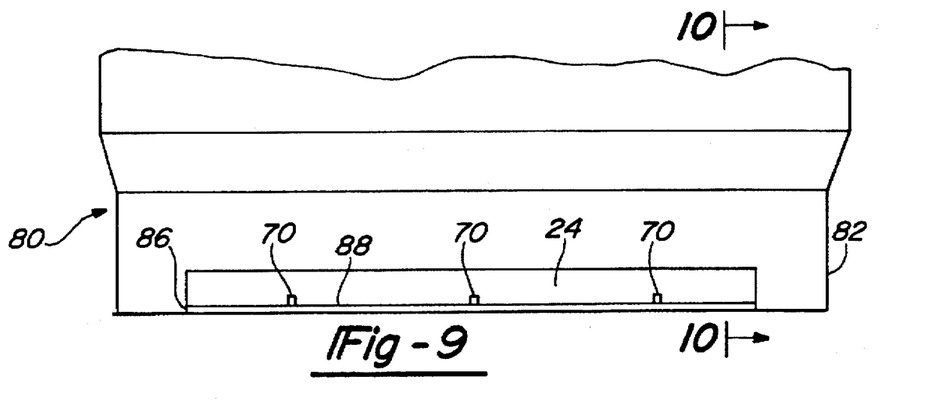
FIG. 9 is a fragmentary front view of a battery shield in accordance with a further embodiment of the invention and which has a longitudinal openings in its front and back walls for permitting the hold down shoulder of the battery to pass through to overlie the battery hold down tray.
Figure 10:
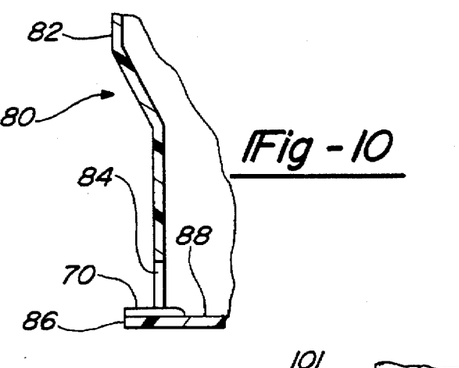
FIG. 10 is a section view taken along line 10—10 of FIG. 9.

Referring to FIGS. 9 and 10, in accordance with an alternative embodiment of a battery shield 80, the front panel 82, and the rear panel (not shown) each has an opening, such as opening 84 near its bottom edge 86. The opening 84 extends substantially the length of panel 82 and is sized and located to permit the hold down shoulders 27 (FIG. 1) of the battery container to pass through the opening to facilitate securing the battery to the hold down tray in the conventional manner. The lower surface 88 of the panel includes an outwardly directed flange which supports a plurality of ribs 70 that urge the upper surface of the hold down shoulder of the battery into engagement with a hold down bracket (not shown). In addition, the openings in the front and rear panels function as air flow slots to permit air flow through the battery shield.

Figure 11:
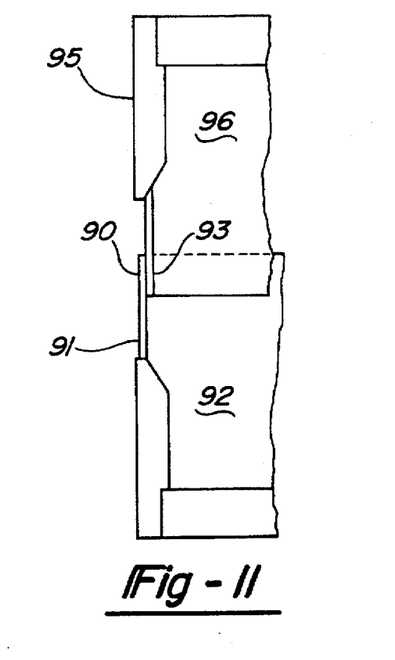
FIG. 11 is a fragmentary top view of an alternative embodiment of a battery shield illustrating in which the ends of the front and rear sections of the battery shield overlap.
Figure 12:
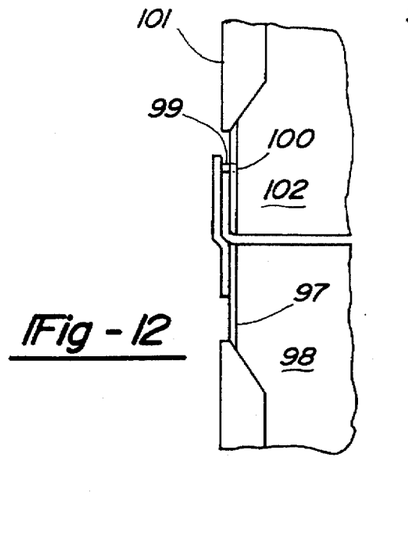
FIG. 12 is a fragmentary top view of a further embodiment of a battery shield which includes a latch mechanism for maintaining together the front and rear sections of the battery shield.

Referring to FIG. 11, in accordance with a further embodiment, the edges 90 of the side panels, such as edge 90 of side panel 91 of front section 92, overlaps the edge 93 of the adjacent side panel 95 of the rear section 96. The overlapping edges are provided on both sides of the battery shield. In accordance with another embodiment illustrated in FIG. 12, a side panel, such as side panel 97 of front section 98, includes a latching mechanism for securing the front section to the rear section. In this embodiment, the latching mechanism includes an extension 99 formed on side panel 97 and a notch or recess 100 formed in the side panel 101 of the rear section 102 that it overlies. When the battery shield is closed, the extension 99 is received in the notch 100 latching the two sections together as shown in FIG. 12. Such latching mechanism can be provided on one or both sides of the battery shield.

Figure 13:
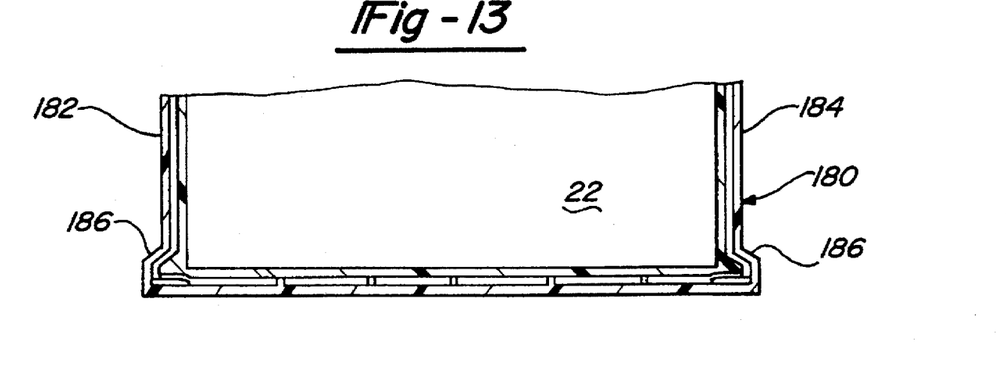
FIG. 13 is a fragmentary side section view illustrating a battery shield and a battery container in which the front and rear panels of the battery shield extend linearly from the hold down shoulder to the top of the battery shield.
Figure 14:
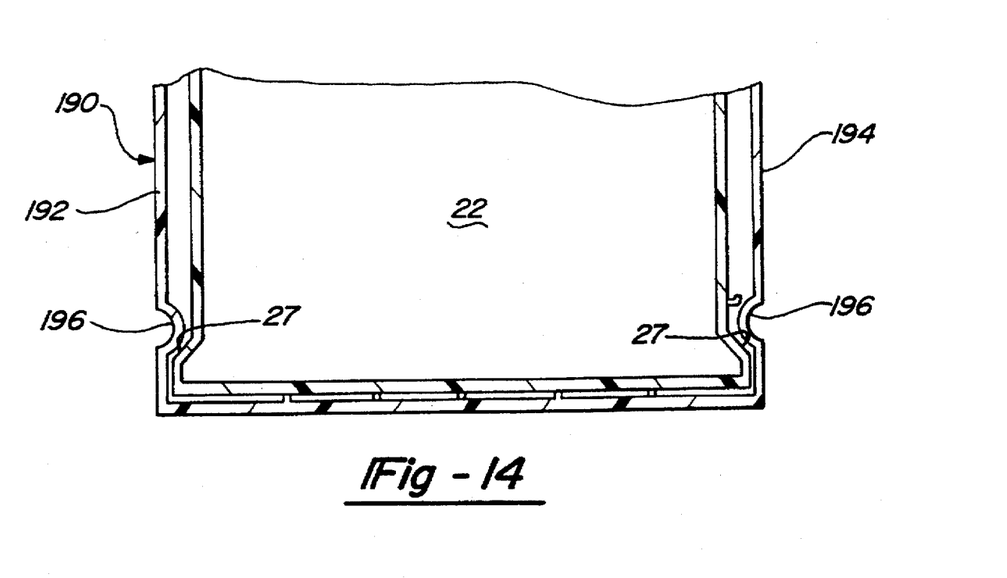
FIG. 14 is a view similar to FIG. 13 of a further embodiment of a battery shield in which the front and rear panels have inwardly directed arcuately shaped sidewall portions which engage the battery hold down shoulders.

In the battery shields 10 and 80, the lower portions of the front and rear panels are directed inwardly above the hold down shoulders to accommodate batteries having their bottom portions recessed relative to the top of the battery. It is pointed out the battery shield can have different configurations depending on application. For example, in accordance with a further embodiment of a battery shield 180 illustrated in FIG. 13 installed on a battery container 22, the front panel 182 and the rear panel 184 of the battery shield extend linearly from the hold down shoulders 186 to the upper edge of the battery shield. The inner surfaces of the hold down shoulders 188 of the front and rear panels engage the battery hold down shoulders 27 of the battery container 22 in the manner described for battery shield 10. In accordance with the embodiment of a battery shield 190 illustrated in FIG. 14, the front panel 192 and the rear panel 194 have inwardly directed arcuately shaped sidewall portions 196 which engage the battery hold down shoulders 27. The front and rear panels extend linearly from above the arcuate portions 196 to the top of the battery shield. In both embodiments, the panels of the battery shield are spaced from the sidewalls of the battery container for providing an air gap therebetween.

Referring again to FIG. 1, the battery shield 10 is molded from a rigid plastic material such as polypropylene. The front, side and bottom panels of the front and back sections are approximately 0.080 inches thick. The battery shield 10 can be produced by an injection molding process or a vacuum molding process, for example, with the front and rear sections molded integrally with the base 18 as a one-piece unit and connected to the base by the integral molded living hinges 19 and 20.

Because the front and rear sections of battery shield 10, and likewise, the front and rear sections of battery shield 80 (FIG. 9), for example, are identical to one another in size and shape, this is conducive to producing the two sections by molding them as separate parts using a common mold and then connecting the two sections together. In such embodiment, the front section and the rear section are molded as separate members and are then joined together by a hinge structure that is connected to the two sections by riveting, by glue, by a heat weld, by heat sealing, by tape, or by any other suitable process.

Referring to FIGS. 1 and 5-7, to install the battery 12 in the battery shield, the shield is opened to the position shown in FIG. 1. Because the front and rear sections are separated from one another when the shield is in the open condition, it is easier to position the battery within the open shield. The battery 12 is lifted into the shield and placed on the base 18, centered on the base. The weight of the battery on the base 18 will cause the bottom panels 33 and 133, and thus, the front and rear sections 14 and 16, to pivot about respective hinges 19 and 20 upwardly and toward one another, enclosing the battery therewithin, in the manner of a "clamshell". The front and back sections rotate until their inwardly directed edges engage the battery. A slight downward force on the battery with bring the bottom panels 33 and 133 into alignment co-planar with the base 18, while pivoting the front and lower sections so that the flanges overlie the upper peripheral edge of the battery cover and the edges of the side panels abutting each other as illustrated in FIG. 6. The weight of the battery pushing down on the hinge is sufficient to keep the battery shield in the closed position. In addition, because of the configuration of the panels 30, 31, 32 130, 131 and 132, the battery shield cooperates with surfaces of the battery container and cover to contribute to the locking the shield to the battery and maintaining the battery shield closed.

Figure 7:
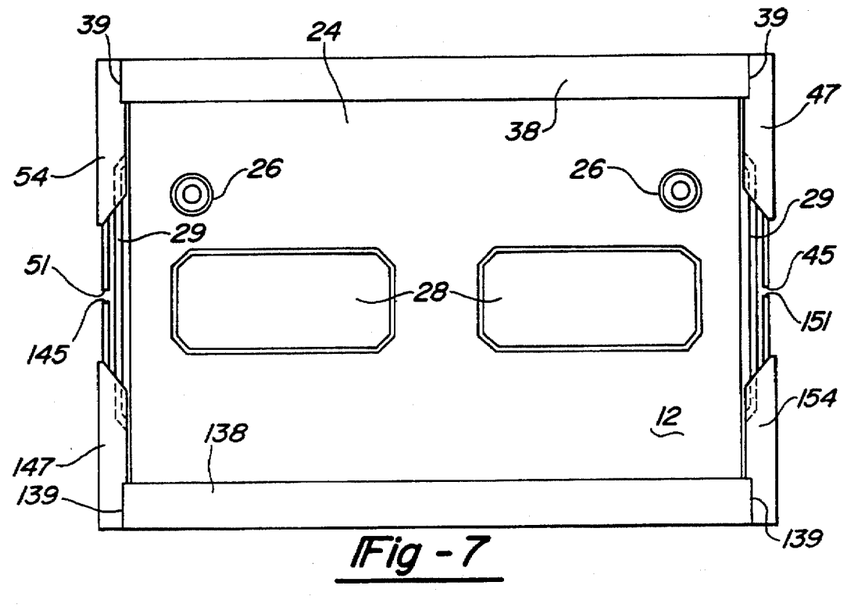
FIG. 7 is a top plan view of the assembly of the battery and the battery shield shown in FIG. 6.

For example, with reference to FIGS. 6 and 7 in conjunction with FIG. 5, when the battery shield 10 is installed on the battery 12, the flanges 38 and 138 on the raised portions of the front and rear sections overlie the battery cover in engaging relationship along the periphery of the front and rear edges providing sealing at the top of the battery shield. Thus, the top flanges 38 and 138, and end portions 39 and 139 thereof, capture the front and rear peripheral edges of the battery cover. In addition, the inwardly directed flanges 47, 54, 147 and 154 on the upper edges of end panels 31 and 32 extend over the outer or end portions of the handle brackets 29 as is shown in FIG. 7. These flanges 47, 54, 147 and 154 project into engagement with the handle bracket at all four corners of the battery to close the upper corner areas of the battery shield, while providing access to the handle brackets when needed. Moreover, as shown in FIG. 6, the vertical portion 136a of rear panel 130, and although not shown, the vertical portion 36a of front panel 30, are located beneath the sloping front and back sidewall portions 25 of the battery container. Also, the lower vertical surfaces 49, 55a, 149 and 155a, shown in FIGS. 3 and 5 for example, of respective end panels 31, 32, 131 and 132, underlie inwardly sloping end wall surfaces of the battery container.

When the battery shield 10 is installed on the battery 12, the inner surfaces of the upper portion of the front, rear and side panels are spaced outwardly from the side walls of the battery container, defining a cavity between the sidewalls of the container and the upper inner surfaces of the battery shield, which cavity extends around the upper portion of the battery container. For example, as shown in FIG. 6, the inner surface 105 of panel 130 is spaced outwardly from the outer sidewall 106 of the battery container, defining a portion of the cavity 108. The cavity, including cavity portion 108, defined by the front, rear and side panels of the battery shield provide an air space or air gap between the outer surface of the battery container and the inner surface of the battery shield over the entire extent of the shield except for the area around the lower front section of the battery where contact is necessary to provide connection between the battery shield and the battery container. The air in the cavity acts as a barrier layer between the outer sidewalls of the battery and the inner surfaces of the battery shield. The edge surfaces of the battery shield, such as the edge surfaces may include a sealing material to enhance the seal between the edges of the battery shield and the outer surfaces of the battery container.

The foregoing arrangement is a passive insulation arrangement. It is apparent that the battery shield front and rear sections 14 and 16 can be provided with one or more suitable air inlets and outlets to allow cooler outside air to be circulated either by fan or as the result of vehicle motion through the inner cavity defined by the enclosure members by to provide active cooling. In addition, the side panels 31, 32, 131 and 132 can have air flow slots therethrough near the bottom to permit air flow through the battery shield. Such slots can be provided by openings, such as those for the hold down shoulders for the embodiment shown in FIG. 9, or can be provided through the front and rear panels 30 and 130 for battery shield 10 illustrated in FIGS. 1-7.

Figures 15, 16:
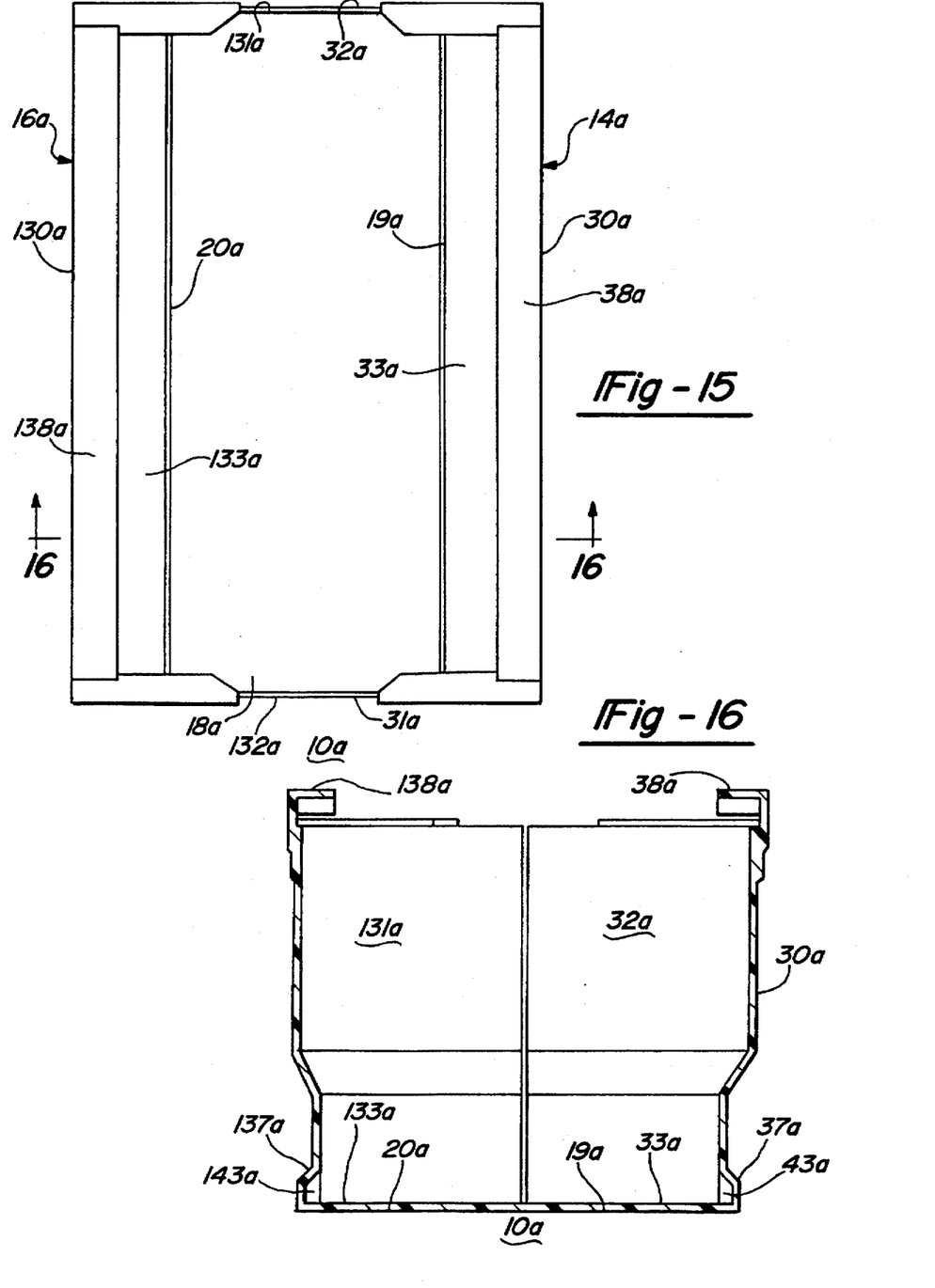
FIG. 15 is a top plan view of a further embodiment of the battery shield provided by the invention.
FIG. 16 is a section view taken along the line 16—16 in FIG. 15.
Figure 17:
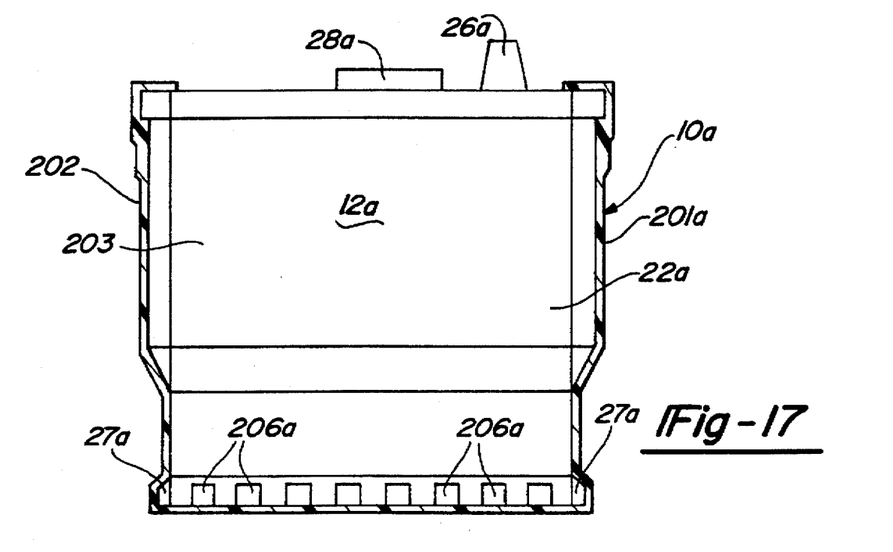
FIG. 17 is a side view similar to FIG. 16 and illustrating the battery shield of FIG. 15 with a battery installed therein; and, FIG. 18 is a bottom view of the battery provided by the invention for use with the battery shield of FIG. 15.

Referring to FIGS. 15-17, there is illustrated a further embodiment of a battery shield 10a which is adapted to be mounted on a storage battery 12a, as shown in FIG. 17, for enclosing the battery and cooperating with the battery to provide thermal stabilization for the battery. The battery shield 10a illustrated in FIGS. 16-17 is similar to battery shield 10 shown in FIGS. 1-7, and accordingly, elements of battery shield 10a have been given the same reference numerals as corresponding elements of battery shield 10, but with a suffix "a". Likewise, elements of the storage battery 12a have been given the same reference numerals as corresponding elements of storage battery 12, but with a suffix "a".

In the embodiment illustrated in FIGS. 15-17, the bottom surface of the battery is formed with one or more channels 206 which define air flow paths for cooling the bottom of the battery. In this embodiment, the base member 18a of battery shield 10a is flat, i.e., base member 18a does not include upwardly directed ribs, such as ribs 65 of battery shield 10. Moreover, the battery 12a forms part of the thermal stabilization arrangement by virtue of the air flow channels 206 provided in its bottom surface which permit air flow around the bottom of the storage battery when the storage battery is enclosed within the battery shield.

Figure 18:
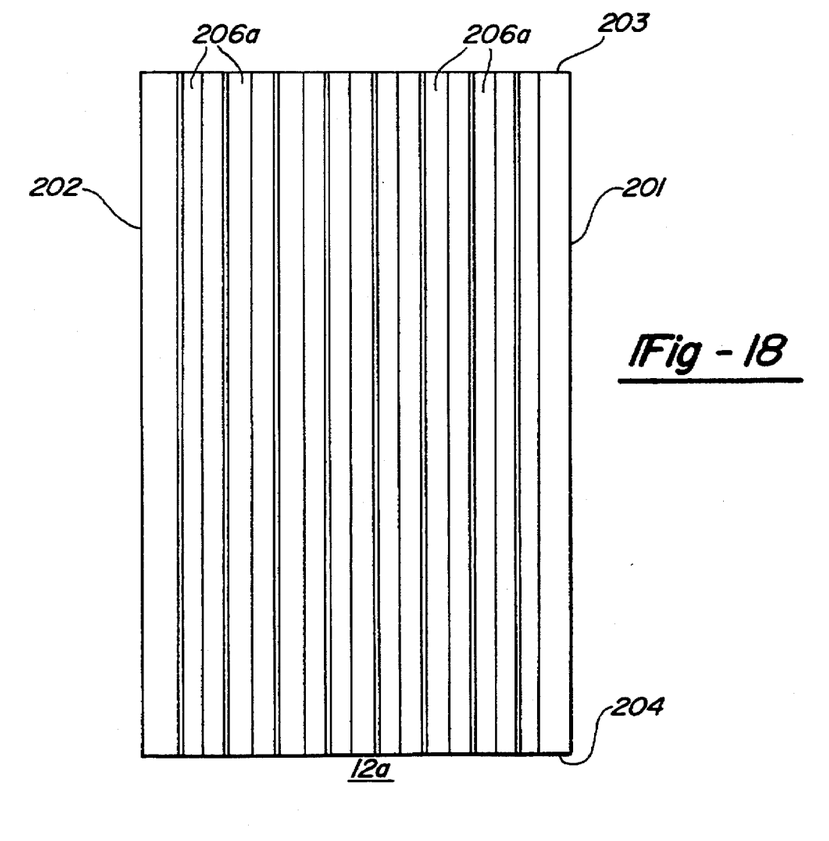

Referring to FIGS. 17 and 18, the storage battery 12a is a conventional lead acid storage battery and includes a container 22a, which contains the battery cells and the electrolyte, and a cover 24a which closes the open upper end of the container and mounts the positive and negative battery terminals 26a. In addition, the battery cover 24a includes vents 28a as is known. The battery 12a has a side defined by front wall 201 of the container 22a, a side defined by back wall 202 of the container, a side defined by end wall 203 of the container, a side defined by end wall 204 of the container, and a bottom defined by bottom wall 205 of the container.

In accordance with the invention, the bottom wall 205 of the container has at least one transverse groove or channel, and preferably a plurality of transverse grooves or channels 206, which extend the width of the container bottom from side wall 203 to side wall 204 as shown in FIG. 18. The channels 206 define one or more air flow channels between the bottom of the battery and the battery shield which allow air flow around the bottom of the battery 12a. In the exemplary embodiment, the channels 206 are rectangular in cross section and are about 0.4 inch wide and about 0.4 inch deep. The channels 206 are spaced apart from one another by about 0.4 inch. The rectangular cross section for the channels provides a maximum cross sectional area, and thus a maximum air flow path, for a given depth for the channels. However, the cross section of the channels can be arcuate or semicircular in shape or have other shapes. Moreover, the dimensions for the channels 206 as well as the channel to channel spacings are those for one embodiment, and the channels can have other sizes and other spacings relative to adjacent channels. The channels 206 can be molded into the bottom of the container which is molded from a rigid plastic material. Alternatively, the transverse openings or channels can be defined by one or more ribs formed on the bottom of the container.

The storage battery includes hold down shoulders 27a which extend along the lower edges of the front and rear sides of the container. The hold down shoulders 27a include first and second portions with a gap therebetween to accommodate the hold down hardware in the manner illustrated in FIG. 6, for example.

Referring to FIGS. 15-17, the battery shield 10a includes a front section 14a and a rear section 16a which are hinged to a bottom or base 18a by respective living hinges 19a and 20a which extend transversely of the base. The battery shield 10a is adapted to be closed around the storage battery 12a as shown in FIG. 17, with its front and rear sections enclosing the storage battery on all four sides and on the bottom, forming a shield structure that provides thermal stabilization for the storage battery.

The front section 14a is a one-piece member which includes a front panel 30a, end panels 31a and 32a and a bottom panel 33a. The upper portion of the front panel 30a includes a horizontal flange 38a inwardly directed and extending along its upper peripheral edge. The lower portion includes a shoulder 37a which defines a compartment 43a that is sized to receive one of the hold down shoulders 27a of the storage battery. The bottom panel 33a of front section 14a is generally rectangular and is formed integrally with the lower edges of front panel 30a and end panels 31a and 32a.

Similarly, rear section 16a is a one-piece member which includes a front panel 130a, end panels 131a and 132a and a bottom panel 133a. The upper portion of the front panel 130a includes a horizontal flange 138a inwardly directed and extending along its upper peripheral edge. The lower portion includes a shoulder 137a which defines a compartment 143a that is sized to receive one of the hold down shoulders 27a of the storage battery. The bottom panel 133a of rear section 16a is generally rectangular and is formed integrally with the lower edges of front panel 130a and end panels 131a and 132a.

The base 18a of the battery shield 10a is a flat generally rectangular member which extends between bottom panel 33a of the front section 14a and bottom panel 133a of rear section 16a and is connected to panels 33a and 133a by the hinges 19a and 20a which permit relative movement of the two sections of the battery shield to permit installation of the storage battery in the battery shield.

The battery shield 10a is mounted on the battery 12a in the manner described for mounting battery shield 10 on battery 12. Also, battery shield 10a defines an air space around the sides of the battery 12a in the manner of battery shield 10. Moreover, the battery shield 10a can have the features of battery shields 10 and 80 as described with reference to FIGS. 1-14, including openings through the lower portions of the panels, latching arrangements, etc.

The air flow channels 206 provided in the bottom 205 of the storage battery 12a obviate the need to provide inwardly directed ribs, such as the ribs 65 (FIG. 2) which are provided on the base of the battery shield 10 for supporting the battery above the battery shield so as to provide a gap therebetween to permit air flow around the bottom of the battery. Because the battery 12a does not have to be raised to provide an air flow gap between the lower surface of the storage battery and the upper surface of the base of the battery shield, the hold down fits existing applications.

It has been found that the battery shield provided by the present invention produces a substantial improvement in battery life with insulating material that is ¼ inch in thickness. As has been described, in accordance with one embodiment of the invention, the battery shield includes insulating material which provides passive insulation of the battery that is being protected. In another embodiment, the battery shield defines a closed air space or air gap between the outer surface of the battery container and the inner surface of the battery shield which insulates the battery from underhood heat. Moreover, the battery may be a part of a thermal management system that supplies forced air cooling by moving air through the cavity of the battery shield.

While the invention has been described with reference to preferred embodiments, various modifications can be made without departing from the spirit and scope of the invention as defined in the appended claims.

What is claimed is:

1. The combination comprising:
    a storage battery having first, second, third and fourth sides and a bottom having a bottom surface said battery further including at least first and second hold down shoulders on opposite sides thereof; and
    a battery shield adapted for installation on said storage battery for thermally insulating said storage battery from heat,
    said battery shield including a first section having at least a front panel, a first side panel and a second side panel, a lower portion of said front panel defining at least one compartment for receiving one of said first and second hold down shoulders when said battery shield is installed on said storage battery;
    a second section having at least a rear panel, a third side panel and a fourth side panel, a lower portion of said rear panel defining at least one compartment for receiving one of said first and second hold down shoulders when said battery shield is installed on said storage battery;
    and connecting means including hinge means connecting said first section to said second section, thereby permitting said first and second sections to be pivoted about said hinge means between an open position for said battery shield, which allows said storage battery to be placed into said battery shield, and a closed position for said battery shield in which said battery shield encloses said storage battery on all sides thereof and at said bottom;
    and said bottom surface of said storage battery having at least one channel therein for permitting air flow around the bottom of said storage battery when said storage battery is enclosed within said battery shield.

2. The combination according to claim 1, wherein each of said panels includes an upper portion having an inner surface and a lower portion, said inner surfaces of said panel upper portions being spaced from upper portions of said sides of said storage battery over a substantial portion of the extent thereof when said battery shield is installed on said storage battery, defining a cavity between said upper portions of said sides of said storage battery and said upper inner surfaces of the storage battery shield, and said lower portions of said panels being tapered inwardly relative to said upper portions of said panels to engage lower portions of said sides of said storage battery when said battery shield is installed on said storage battery.

3. The combination according to claim 1, wherein said connecting means includes a base having first and second sides, a first hinge connecting said first side of said base to said first section, and a second hinge connecting said second side of said base to said second section.

4. The combination according to claim 1, wherein said bottom of said storage battery has a plurality of channels therein.

5. The combination according to claim 4, wherein said channels are rectangular in cross section.

6. The combination according to claim 4, wherein said channels extend between first and second opposing sides of said storage battery.

7. The combination comprising:
    a storage battery having first and second opposing sides, third and fourth opposing sides, and a bottom having a bottom surface; and
    a battery shield adapted for installation on said storage battery for thermally insulating said storage battery from heat,
    said battery shield including a first section having a front panel, first and second side panels, and a first bottom surface panel;
    a second section having a rear panel, third and fourth side panels, and a second bottom panel;
    and connecting means including hinge means connecting said first bottom panel to said second bottom panel, thereby permitting said first and second sections to be pivoted about said hinge means between an open position for said battery shield, which allows said storage battery to be placed into said battery shield, and a closed position for said battery shield in which said battery shield encloses said storage battery on all sides thereof and at said bottom, each of said panels including an upper portion having an inner surface and a lower portion, said inner surfaces of said panel upper portions being spaced from upper portions of said sides of said storage battery over a substantial portion thereof when said battery shield is installed on said storage battery, defining a cavity between said upper portions of said sides of said storage battery and said upper inner surfaces of the battery shield that extends around the upper portion of said storage battery, and said lower portions of said panels being tapered inwardly relative to said upper portions of said panels to engage lower portions of said sides of said storage battery when said battery shield is installed on said storage battery;
    and said bottom of said storage battery having a plurality of transverse channels therein extending from said first side to said second side for permitting air flow around the bottom of said storage battery.

8. The combination according to claim 7, wherein said storage battery includes at least first and second hold down shoulders on opposite sides thereof, said lower portions of said front and rear panel each defining at least one compartment for receiving said first and second hold down shoulders, respectively, when said battery shield is installed on said storage battery.

9. The combination comprising:

a storage battery having first, second, third and fourth sides and a bottom having a bottom surface; and a battery shield adapted for installation on said storage battery for thermally insulating said storage battery from heat, said battery shield including a first section having at least a from panel, a first side panel and a second side panel;

a second section having at least a rear panel, a third side panel and a fourth side panel;

and connecting means, said connecting means including a base having first and second sides, a first hinge connecting said first side of said base to said first section, and a second hinge connecting said second side of said base to said second section, thereby permitting said first and second sections to be pivoted about said connecting means between an open position for said battery shield, which allows said storage battery to be placed into said battery shield, and a closed position for said battery shield in which said battery shield encloses said storage battery on all sides thereof and at said bottom;

and said bottom surface of said storage battery having at least one channel therein for permitting air flow around the bottom of said storage battery when said storage battery is enclosed within said battery shield.

10. The combination in accordance with claim 9 wherein said bottom of said storage battery has a plurality of channels therein.

11. The combination in accordance with claim 10 wherein said plurality of channels are rectangular in cross-section.

12. The combination in accordance with claim 10 wherein said channels extend between first and second opposing sides of said storage battery.

13. The combination in accordance with claim 9 wherein each of said panels includes an upper portion having an inner surface and a lower portion, said inner surfaces of said panel upper portions being spaced from upper portions of said sides of said storage battery over a substantial portion of the extent thereof when said battery shield is installed on said storage battery, defining a cavity between said upper portions of said sides of said storage battery and said upper inner surfaces of the storage battery shield, and said lower portions of said panels being tapered inwardly relative to said upper portions of said panels to engage lower portions of said sides of said storage battery when said battery shield is installed on said storage battery.

* * * * *